Aug. 12, 1969  J. J. J. STAUNTON  3,461,055
REFERENCE ELECTRODE AND METHOD OF MAKING SAME
Filed Oct. 6, 1966
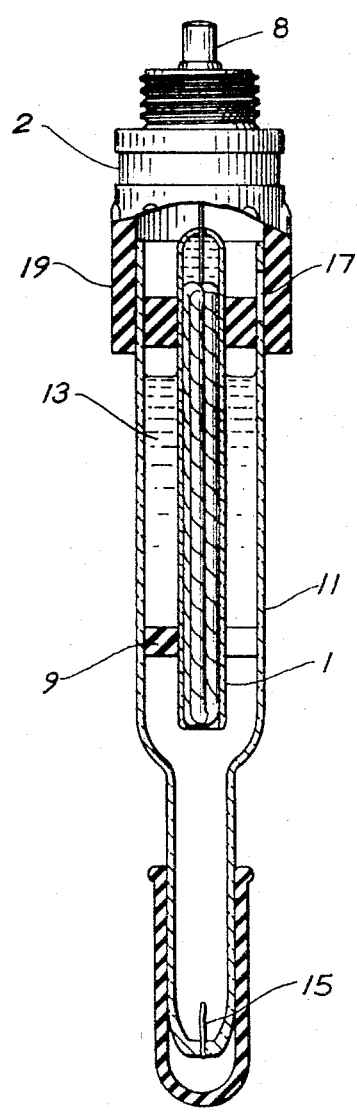
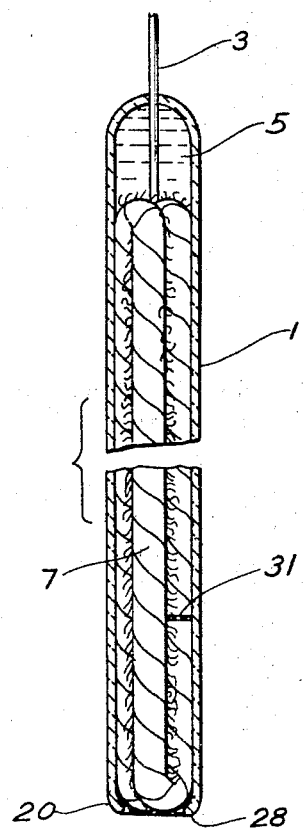
INVENTOR.
JOHN J. J. STAUNTON 3,461,055
REFERENCE ELECTRODE AND METHOD OF MAKING SAME
John J. J. Staunton, Oak Park, Ill., assignor to The Perkin-Elmer Corporation, Maywood, Ill., a corporation of New York
Filed Oct. 6, 1966, Ser. No. 584,837
Int. Cl. B01k 3/04
U.S. Cl. 204—195                    7 Claims

ABSTRACT OF THE DISCLOSURE

An improved reference electrode is fabricated from a glass tube with a terminal wire sealed in one end of the tube and a chemical half cell solution enclosed in the tube for contact with the terminal wire. A yarn packing saturated with electrolyte is inserted through the opposite end of the tube to maintain the chemical solution in the tube and to also provide a bridge with the half cell.

---

This invention relates to a reference electrode construction useful in the measurement of hydrogen ion activity (pH), and more particularly to a novel half cell construction.

Reference electrodes have changed little in construction during the past thirty years in spite of the facts that they are difficult to make or repair, are subject to damage by overloading or poisoning and may be damaged by drying out or by freezing during storage and shipment. Recent development of glass electrodes responding to cations other than hydrogen and the increasing use of metal electrodes for chloride and other anions and for polarographic cell chains place even more importance on a proper functioning reference electrode.

A reference electrode comprises an internal half cell disposed within a tube filled with salt solution which provides an electrical path between the half cell and the solution being tested. The half cell establishes a constant reference potential with respect to the test solution which should remain constant during the life of the half cell. The reference electrode usually consists of a small diameter (¼" approximately) glass tube having a platinum wire sealed in one end thereof; a mixture of calomel and mercury in contact with said wire; a wad of fibrous material, usually asbestos, saturated with electrolyte supporting the mixture to keep it in contact with the wire; and a liquid junction such as a wick or tiny aperture to make ionic contact with the solution in the reference cell surrounding the half cell. The electrolyte saturating the fibrous material is commonly called a salt bridge and consists of a saturated solution of potassium chloride or other salt.

Heretofore in manufacturing electrodes, the salt bridge was made by tamping shredded asbestos into the tube prior to making the half cell to provide a packing to trap the metal-metal salt mixture in the sealed end of the tube in contact with the platinum wire or other conductor. (In this specification, the portion of the electrode above the salt bridge is referred to as the "half cell.") The tamping is accomplished manually, using a very small diameter glass rod. The asbestos fibers must be packed rather tightly to retain the metal-metal salt mixture and not infrequently the thin glass rod breaks and causes injury to the workman. Consequently, the workmen proceed with extreme caution and this makes the packing operation difficult and time-consuming. This is true in spite of attempts to facilitate packing the fibers by utilizing very short fibers and wetting them prior to insertion. Such reference electrodes also suffer from another drawback. If the electrolyte is permitted to stand in the air, rather than being immersed in solution, a bubble will form somewhere in the length of the packing and the packing will separate at this point with a loss of continuity between the liquid junction and the metal-metal salt mixture. This results in an open circuited electrode which is, of course, inoperable.

One object of the present invention is to provide a novel reference electrode packing which can be easily and quickly inserted, which effectively retains the calomel-mercury or other metal-metal salt equilibrium mixture, and which does not lose continuity if inadvertently permitted to dry out. Such packing material must not react chemically with potassium chloride, must withstand temperatures up to 100° C., must provide a good diffusion barrier for the potassium chloride, must not be electrically active, must wet easily and be readily inserted into the electrode tube.

Another object is to provide a reference electrode which can be quickly and effectively renewed if poisoned and which can be shipped and stored in semi-activated condition and then reactivated when desired.

These and other objects and advantages of my invention are achieved by incorporating in the electrode a packing made from synthetic plastic or other suitable material having longitudinally continuous wettable and liquid-retaining structure, i.e., capillary cells, interstices, or the like which are disposed axially of the tube. The invention will be readily understood from the following description when considered in conjunction with the accompanying drawing, in which:

FIG. 1 is a sectional view through a reference electrode having a half cell constructed in accordance with my invention; and FIG. 2 is a similar view greatly enlarged on the half cell construction.

The electrode consists of a glass tube 1 into which a platinum wire 3 is sealed at the upper end and which is open at lower end 20. Wire 3 makes contact with the components of the half cell 5 which may, in the case of the conventional calomel half cell, be mercury coated with mercurous chloride, i.e., calomel. A liquid such as potassium chloride solution contacts this equilibrium mixture and provides a supply of chloride ions. This mixture of metal and metal salt is physically retained and provided with protective isolation by the packing 7 which fills the remainder of the tube 1. This packing and its method of insertion will be described hereinbelow. It will be noted that the bottom of the tube is completely open, thus eliminating the conventional wick or capillary opening between the half cell and the solution in the liquid junction reservoir. The tube 1 is concentrically supported within a second larger glass tube 11 by insulating spacers 9. Tube 11 is the liquid junction reservoir and contains potassium chloride solution 13. It has a sealed-in wick 15 of asbestos or a porous plug or aperture in the lower end thereof to communicate electrically with the surrounding sample solution into which the tube 11 is immersed while suitably retarding the outflow of the solution 13. A filler opening 17 is provided in the side of the tube 11 and normally is covered by a rubber sleeve 19 which may be slipped down to permit filling the tube with solution 13. A cap or ferrule 2 covers the top of the tube 11 and has a connector 8 to which the platinum wire extends and makes connection with the terminal of the pH meter or controller through an insulated cable, not shown, which screws on to the connector 8.

Referring more specifically to the half cell structure, the tube 1 may be glass or a transparent plastic such as polycarbonate, or for low temperature use, polymethylmethacrylate is acceptable. If glass, lead glass may be used to compatibly seal to the terminal wire 3 which, as indicated, is platinum for a calomel type half cell. If the half cell mixture is to be silver-silver chloride, the wire may be silver-plated platinum or, if desired, silver wire may be used. Because of my novel reference electrode construction is filled from the bottom open end, the platinum wire 3 may be sealed and the tube annealed as a first fabricating step. Thus, I provide a seal that is free from the strains and accompanying cracking encountered heretofore where the seal is formed as a final fabricating step. In accordance with the prior art, the tube 1 was closed at the bottom end and a wick inserted similar to that shown in the tube 11 in FIG. 1. Consequently, these prior tubes were filled in the reverse order and the last operation consisted in sealing the wire 3 in the glass tube. In using short fiber asbestos packing, it is not practical to have an open end such as used in my invention because the asbestos material is difficult to retain and also because the open end renders the packing vulnerable to drying out should the end be removed from the electrolyte solution 13. The tube 1 constructed in accordance with the invention has only a slight internal lip or constriction 28 to provide adequate retention for the novel packing of my invention.

After the conducting wire 3 has been sealed in the end of the tube, the chemical filling 5 is introduced through the open end. This is followed by inserting the packing 7 and wetting the packing with potassium chloride solution. The packing 7 may consist of a cellular plastic foam material which has interconnecting cells, or a yarn made from spun fibers which is hydrophilic, does not react with KCl, and withstands temperatures of 100° C. The material must be elastomeric to permit it to be compressed into the tube as a packing. It must remain resilient, even after heating, and must not be subject to cold flow or take a permanent set so that it will persist in maintaining an uninterrupted path from the bottom to the top of the electrode tubing. The preferred material for use as a packing in accordance with the invention is a synthetic yarn having a long staple fiber length made from plastic (synthetic resin) having the characteristics previously mentioned, although cotton or natural fiber yarns are operable. A typical yarn which has been found to be completely satisfactory is sold under the trade name "Sayelle," a trademark of the Du Pont Company for its bi-component acrylic fiber (from 35% to 85% acrylonitrile). Nylon (polyamide) and Dacron (polyester) yarns are also suitable. These synthetic yarns are well known in the art. (See Moncrieff, "Man Made Fibers," Wiley, 1963.) A four fold knitting worsted type yarn is suitable, although the type and weight of yarn would necessarily depend on the size and configuration of the electrode to be packed. The yarn comes in a variety of colors which do not lose dye, and this permits the reference half cell to be color coded. This is an important advantage since normally the mixture of metal-metal salt which would distinguish the electrodes one from another is hidden inside the ferrule 2 for protection against rapid temperature changes and against light in instances where the cell is of the silver-silver chloride variety.

The tube 1 may typically be 4 mm. lead glass tubing having an inside diameter of about 3 mm. To pack such a tube the yarn is cut into lengths three times the length of the space to be packed, thus assuring proper compression of the yarn after packing. The yarn is doubled back on itself with one strand about 10% longer than the other. The yarn loop is then pushed into the tube using a Teflon or stainless steel flat rod and applying sufficient force to push it into snug contact with the chemical contents 5. The rod is then withdrawn about an inch and again used to push more of the yarn into the tube bore. This process is repeated until the short end of the yarn reaches the point 31, FIG. 2. The long end of the yarn is then tucked in to close the axially-disposed liquid path with the short end at point 31 leaving the loop of yarn at the end 20 of the tube flush to not more than 1/16" recessed. A greater recess tends to collect an air bubble at the opening which might interfere with proper conductivity through the salt bridge. It is extremely important that the fibers provide a continuous path or conduit for the electrolyte solution so that there is no discontinuity, transverse interface, or break in the bridge. This is accomplished by arranging the yarns parallel with the axis of the tube.

A less desirable substitute for the synthetic yarn is a polyurethane foam of the interconnecting cell type. Preferably, the foam should be of the polyether type. Strips of this material can be inserted into the tube 1 as a packing and will readily soak up potassium chloride and function as a salt bridge. The interconnecting cells serve as an uninterrupted hydrophilic bridge from the open end of tube 1 to the chemical filling 5. The foam material is not as efficient as the synthetic yarn, however, in retaining the chemical 5 in position.

The packed electrodes may be stored indefinitely in a clean place prior to filling with electrolyte solution. One unexpected advantage of my construction is that it may be easily activated through the open end by immersing to a depth of about 1" in potassium chloride solution. The electrode may be placed in a desiccator and a vacuum drawn on the space above the KCl causing the air to leave the electrode and bubble up through the salt solution. This is accomplished without causing the mercury of a calomel cell to penetrate the yarn packing. The yarn effectively retains the calomel coated mercury. Thus, it is unnecessary to interpose filter paper or other dense barrier at the interface between the yarn and the contents 5 during filling. As soon as the vacuum is released, the electrolyte solution rushes into and fills completely the continuous fiber interstices. Should the bridge become dried, it can be reactivated at once by repeating this process. As a further advantage, in an emergency suction may be applied orally to refill the electrode. Even without vacuum, several hours immersion of the open end 20 into electrolyte solution will cause the packing to wet and restore service although the packing does not completely displace all of the air under such circumstances. However, the unique advantage of my packing material is that unlike the short transverse fiber orientation of asbestos packings or the discontinuous structure of glass bead packings, the longitudinally extended structure establishes and maintains a plurality of continuous conductive paths even with a minimum of electrolyte solution present.

Another important advantage of my packing is the ease with which an electrode may be renewed. It is common practice in making chloride titrations (where chloride ions must not pass into the sample under test) to substitute potassium nitrate solution in the liquid junction reservoir 13. Eventually, the potassium nitrate will diffuse into the half cell and alter its value. Unlike prior electrodes, my construction may be purged, rinsed with electrolyte solution if necessary, and refilled by the same process used for original activation. In testing alcohols, solvents and other such materials for pH, a reference electrode may eventually become poisoned by diffusion of the solvent into the electrode. Here again, unlike prior electrodes, purging and restoration of the construction of the invention is easy. After extended periods of use, the packing 7 may deteriorate and in such case it is a simple matter for a laboratory technician to withdraw the packing, change the half cell contents if necessary, repack and reactivate in less than 5 minutes. Prior electrodes generally cannot be salvaged.

It will be apparent from the foregoing description that modifications can be made within the scope of the claims of my patent without departing from the spirit of the invention.

What I claim is:

1. An improved reference electrode comprising a tubular container open at one end, a conductor communicating between the inside and outside of said container, a chemical filling electrically contacting said conductor and formulated to act as a half cell, the improvement consisting of a fibrous packing disposed between said filling and said open end, said packing being a resilient, nonflowable, diffusion barrier for said chemical filling and having longitudinally continuous interstices forming an uninterrupted hydrophilic bridge, said bridge being ionically conductive when said interstices are filled with an electrolyte solution.

2. The electrode of claim 1 in which the packing comprises overlapping longitudinally disposed synthetic fibers, the space between said fibers forming said interstices.

3. The electrode of claim 1 in which the packing consists of a long staple synthetic fiber yarn.

4. The electrode of claim 3 in which said yarn has two ends which joint at a point above said open end of the tubular container.

5. The electrode of claim 2 in which said synthetic fibers are formed from an acrylonitrile copolymer.

6. The electrode of claim 1 in which said packing is dyed as a means for providing indicia for the half cell to indicate the chemical nature of the half cell.

7. A method of making a tubular reference electrode having a diffusion-limiting fibrous packing having longitudinally continuous interstices, comprising the steps of filling said tube with the packing material oriented so that the longitudinally continuous interstices form an uninterrupted hydrophilic path between the ends of the electrode and filling said interstices with electrolyte solution.

References Cited

UNITED STATES PATENTS

| 2,387,727 | 10/1945 | Godshalk | 204—195 |
| 2,934,484 | 4/1960 | Anderson | 204—195 |
| 2,977,293 | 3/1961 | Ingold | 204—195 |
| 3,000,804 | 9/1961 | Cahoon et al. | 204—195 |
| 3,103,480 | 9/1963 | Watanabe et al. | 204—195 |
| 3,208,927 | 9/1965 | Arthur et al. | 204—195 |

JOHN H. MACK, Primary Examiner

T. TUNG, Assistant Examiner